United States Patent

[11] 3,587,330

[72] Inventor James W. Deer
Portland, Oreg.
[21] Appl. No. 776,717
[22] Filed Nov. 18, 1968
[45] Patented June 28, 1971
[73] Assignee Electronic Specialty Company,
Portland, Oreg.

[54] VERTICAL REFERENCE SYSTEM
5 Claims, 5 Drawing Figs.
[52] U.S. Cl.................................................. 74/5.6,
73/504, 74/5.8
[51] Int. Cl.................................................. G01c 19/28,
G01p 9/02
[50] Field of Search.......................................... 74/5.8,
5.41, 5.42, 5.47; 73/504; 33/226

[56] References Cited
UNITED STATES PATENTS
3,267,745  8/1966  Smead et al. ................. 74/5.41X
3,279,086  10/1966  Schlitt et al................... 74/5.47X
3,329,028  7/1967  Schaffer........................ 74/5.41

Primary Examiner—Manuel A. Antonakas
Attorney—Buckhorn, Blore, Klarquist and Sparkman ABSTRACT: A vertical reference system is provided for supplying output electric signals proportional to the sines of the angles of tilt of a structure with respect to the vertical about two tilt axes at right angles to each other. The specific system disclosed includes a vertical gyroscope having a rotor mounted in inner and outer gimbals on a gyroscope support which in turn is rigidly secured to the structure subject to being tilted. Two force balanced accelerometers are secured to the gyroscope support and each is positioned to sense the angle of tilt of the structure about one of such tilt axes. The accelerometers are employed in conjunction with pickoffs and torquers on the axes of the gimbals to maintain the spin axes of the gyroscope vertical. The output signals are obtained from the pickoffs on the gimbal axes.

PATENTED JUN 28 1971

JAMES W. DEER
INVENTOR

BY
BUCKHORN, BLORE, KLARQUIST & SPARKMAN
ATTORNEYS

VERTICAL REFERENCE SYSTEM

BACKGROUND OF THE INVENTION

Vertical reference systems for supplying signals proportional to the sines of the angles of tilt of a structure with respect to the vertical about two axes at right angles to each other have been previously provided in which force balanced accelerometers or other devices for sensing angles with respect to the vertical are employed in conjunction with a vertical gyroscope. It has heretofore been considered necessary to mount such angle sensing devices on the inner gimbal of the gyroscope in which case the angles sensed by such devices are the angles between the spin axis of the gyroscope and the vertical about two axes at right angles to each other and at right angles to the spin axis of the gyroscope.

Amplified signals from the angle sensing devices are supplied to torquers on the correct gimbal axes to cause the gyroscope to process back to a position in which its spin axis is vertical. The signals proportional to the sines of the angles of tilt of the structure are obtained from angle pickoffs on the gimbal axes. These tilt angles are thus the angles about the gimbal axes between the vertical and a line associated with the gyroscope support which is vertical when this support has zero tilt.

The prior art systems just described requires slip rings on the gimbal axes to enable signals from the force balanced accelerometers on the inner gimbal to be delivered to external amplifiers. These slip rings are in addition to the slip rings required for delivering signals from the pickoffs on the gimbal axes to external amplifiers and from such amplifiers to the torquers on such axes and also similar slip rings for supplying exciting power to such pickoffs and torquers as well as to the driving motor for the gyroscope rotor. The slip ring structures of the prior art are thus quite complicated and this results in undesired frictional torques about the gimbal axes. Also the accelerometers on the inner gimbal are commensurate in size and weight with the inner gimbal itself. This lowers the nutation frequency of the gyroscope to a value which can cause the gyroscope to go into sustained nutation. Also the increased weight can cause severe mechanical vibration problems, particularly at one of the gimbal resonant frequencies. This is possible since necessary clearance in the gimbal bearings provides for relative movement between the gimbals and their supports.

In accordance with the present invention the vertical sensing devices are removed from the inner gimbal of the gyroscope and are strapped down to the structure which is subjected to tilting, for example, a vehicle which is driven over rough terrain. The strapping down is preferably accomplished by rigidly securing the frame portions of the vertical sensing devices to the gyroscope support and rigidly securing such support to the structure but it is apparent that the sensing devices may be secured directly to the structure or otherwise secured in fixed position relative to the support. Positioning the vertical sensing devices so as to be tilted with such structure rather than on the inner gimbal has, in a specific example, enabled the elimination of four slip rings from the inner gimbal axis and five slip rings from the outer gimbal axis. The nutation and vibration problems referred to above are reduced to tolerable levels or entirely eliminated.

It is therefore an object of the invention to provide a simplified and more accurate vertical reference system.

A specific example of a vertical reference system in accordance with the invention is shown in the attached drawing of which:

Figure 1:
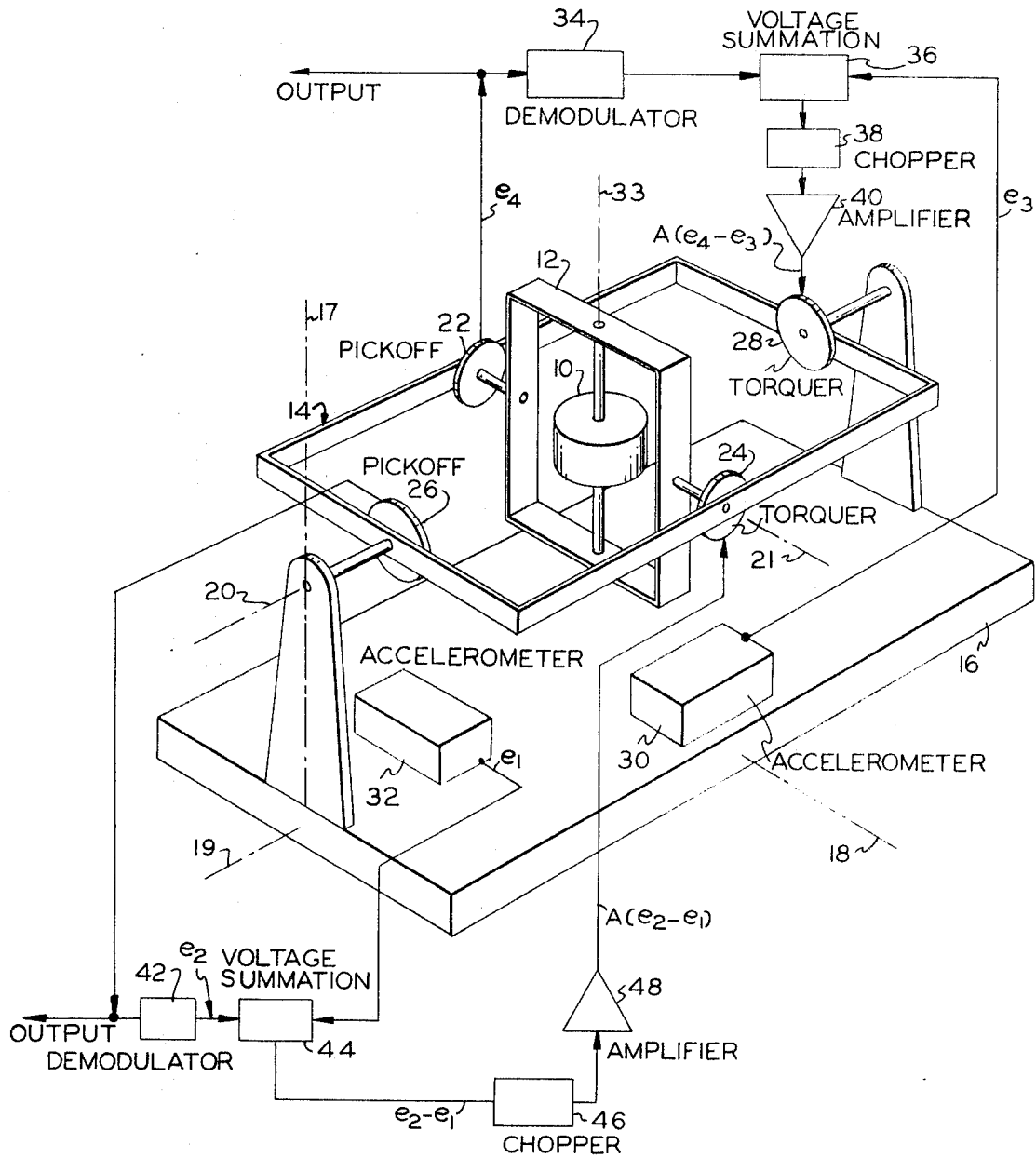
FIG. 1 is a diagrammatic isometric view of the mechanical features of the system with electric circuits indicated in block diagram thereon.

Referring to FIG. 1 of the drawing, a vertical gyroscope 10 is diagrammatically shown as having a rotor mounted in inner and outer gimbals 12 and 14, respectively, on a gyroscope support 16 which it will be understood would actually be a gyroscope case. This support would be in turn mounted upon and form part of a structure, such as a vehicle or aircraft, or the like, subject to being tilted.

Assuming that the upper surface of the support is a plane which is horizontal when the structure referred to is not tilted, a perpendicular to such surface for example the dash-dot line 17 in FIG. 1 will be at an angle to the vertical, when the structure is tilted. This angle can be resolved into two tilt angles with respect to the vertical one about the axis indicated by the dot-dash line 18, and the other about the axis indicated by the dot-dash line 19. For convenience the axis 19 may be parallel to the outer gimbal axis 20 and the axis 18 may be normal to the axis 19 and to the outer gimbal axis. In FIG. 1 the axis 18 is in the same plane as the inner gimbal axis 21 and parallel to such axis 21 when the outer gimbal is in the position with respect to the base 16 shown in FIG. 1.

The inner gimbal 12 is provided with an angle sensing pickoff and also a torquer 24 on its gimbal axis 21. A force balanced accelerometer 30 is secured to the gyroscope support 16 so as to sense any corresponding angle between the perpendicular 17 to the upper surface of the support 16 and the vertical about the axis 18. Similarly the outer gimbal 14 is provided with an angle sensing pickoff 26 and a torquer 28 on its gimbal axis 20, and a similar force balanced accelerometer 32 is secured to such support to sense any corresponding angle between such perpendicular and the vertical about the axis 19.

The pickoff 22 senses the angle between the perpendicular to the upper surface of the support 16 and the spin axis of the gyroscope, indicated by the dash-dot line 33, about the axis 21. When the spin axis 33 is vertical, the angle sensed by the pickoff 22 is equal to and opposite in direction to the angle sensed by the accelerometer 30. Thus the algebraic sum of these angles is zero and any such sum which is not zero results from the spin axis of the gyroscope being out of alignment with the vertical. An amplified combined signal which is a function of the algebraic sum referred to is provided by a circuit including a demodulator 34 for a signal from the pickoff 22, a voltage summation circuit 36 to which the signal from the accelerometer 30 is also supplied, a chopper 38 and a high gain servoamplifier 40. This amplified signal from the amplifier 40 is supplied to the torquer 28 on the outer gimbal axis 20 to produce a torque about this axis in a direction to cause the gyroscope to process about the axis 21 to reduce to zero the angle about this axis between the spin axis 33 and the vertical, thus reducing the amplified signal to zero.

Similarly an amplified combined signal, which is a function of the algebraic sum of the angle sensed by the pickoff 26 on the outer gimbal axis 20 and the angle with the vertical sensed by the accelerometer 32, is provided by the circuit including the demodulator 42, voltage summation circuit 44, chopper 46 and high gain servoamplifier 48. This amplified signal is supplied to the torquer 24 on the inner gimbal axis 21 to cause this torquer to apply torque about the axis 21 in a direction to cause the gyroscope to process about the axis 20 of the outer gimbal to reduce to zero the angle about this axis between the spin axis 33 and the vertical. These actions maintain the spin axis of the gyroscope vertical. Alternating current output signals which are a function of the angles of tilt of the gyroscope support 16 and the structure to which it is secured with respect to the spin axis of the gyroscope about the respective gimbal axes can be obtained from the pickoffs 22 and 26, or similar direct current output signals can be obtained from the output terminals of the demodulators 34 and 42 as will become apparent below.

Figure 2:
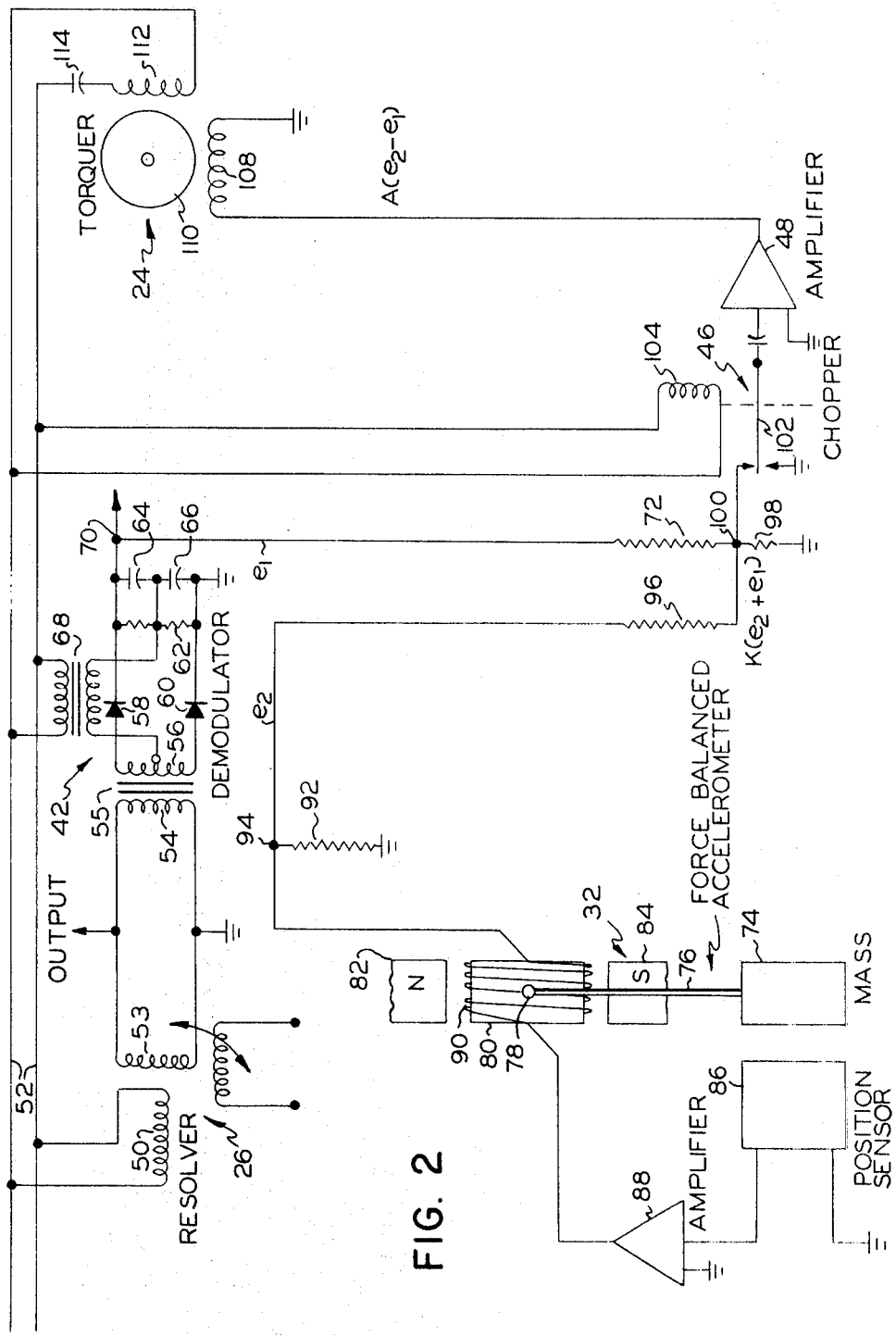
FIG. 2 is a schematic diagram of an electric circuit for producing an output signal proportional to the sine of the angle of tilt of the gyroscope support or structure to which it is secured about one tilt axis with certain mechanical structure shown diagrammatically thereon.

A schematic diagram of the circuits indicated on FIG. 1 is shown in FIG. 2. This circuit may be that associated with the pickoff 26 on the axis 20 of the outer gimbal and the accelerometer 32, and which includes the demodulator 42, voltage summation circuit 44, chopper 46 and amplifier 48, supplying an amplified difference signal to the torquer 24 on the axis of the inner gimbal.

The pickoff 26 is shown as a resolver having an exciting winding 50 supplied from a single phase alternating current line 52 and positioned on one member of the resolver. Such resolver usually has two separate output windings on another member relatively rotatable with respect to the first mentioned member. One winding 53 only of these two windings is employed and is connected to the primary winding 54 of a transformer 55 forming part of the demodulator 42.

The secondary winding 56 of the transformer 55 is center tapped and has its end terminals connected through diodes 58 and 60 to the end terminals, respectively, of a center tapped resistor 62 having capacitors 64 and 66 connected across its respective halves. The secondary winding of a transformer 68, having its primary winding connected across the line 52, is connected between the center tap of the winding 56 and the center tap of the resistor 62.

It will be apparent that the demodulator 42 includes two parallel single phase rectifier circuits supplied from the transformer 68, which separately charge the capacitors 64 and 66 so as to maintain direct current flow in opposite directions through the opposite halves of the resistor 62. In the absence of any signal from the winding 56 of the pickoff 26 and with the demodulator circuit properly balanced, equal direct current voltages with respect to the center tap of the resistor 62 appear at the end terminals of this resistor so that there is no output voltage from an output terminal 70 with respect to ground.

In the position of the resolver winding 53 shown in FIG. 2, no voltage is supplied to the primary winding 54 of the transformer 55 but any relative rotation of the winding 53 with respect to the exciting winding 50 of the resolver from the position shown in FIG. 1 due to relative rotation of the outer gimbal 14 of FIG. 1 and the gyroscope support 16 about the axis 20 of the outer gimbal due to tilting of the gyroscope support 16, will result in an angular relation of these windings which will supply a voltage to the primary winding 54. Current flow in such winding will result in inducing an alternating voltage in the secondary winding 56 which is in phase with and adds to the voltage from the transformer 68 across one-half of the winding 56 and which is 180° out of phase with and subtracts from such voltage from the transformer 68 across the other half of the winding 56. The result is that a direct current voltage $e_1$ measured with respect to ground will appear at the output terminal 70 of the demodulator 42 which is proportional to the sine of the angle of rotation of the winding 52 relative to the winding 50 from the position shown, and which changes in polarity in accordance with the direction of such angle from the zero voltage position of the winding 53. This is true since the excitation from the transformer 68 supplies the iron losses of the transformer 55 and insures that the diodes are conducting and operate on the linear portions of their characteristics. The output from the terminal 70 of the demodulator is connected to one terminal of a resistor 72 forming part of the voltage summation circuit 44.

The type of force balanced accelerometer 32 shown in FIG. 2 is commercially available and includes a pendulous mass 74 carried by one end of an arm 76 pivoted to the frame of the accelerometer at 78. The pivot has a core 80 secured thereto and positioned between the poles 82 and 84 of a permanent magnet structure. A position sensor 86 is supported adjacent the mass 74. In the type of accelerometer disclosed, this sensor contains the tank circuit inductor of an oscillator circuit (not shown). The mass 74 is of conducting metal and the amplitude of the output of the oscillator referred to depends upon the proximity of the mass 74 to the sensor 86, since eddy current losses in the mass load the oscillator to an extent depending upon the distance between the mass and the sensor. The closer the mass to the sensor the less the amplitude of the output and vice versa. This is sometimes referred to as control of the amplitude of the output of an oscillator by spoiler action.

The output of the sensor 86 is delivered to a high gain amplifier 88 which converts this output of the oscillator to a direct current signal which is zero when the mass 74 is in a predetermined position relative to the sensor 86, and is of one polarity when the mass moves closer to the sensor and of the other polarity when the mass moves away from the sensor. The output of the amplifier 88 is supplied to a coil 90 wound upon the core 80 and connected in series with a resistor 92, the circuit being completed through ground.

Current flow through the coil 90 is in a direction producing a torque tending to return the mass 74 to the predetermined position referred to above with respect to the position sensor 86. The result is that the direct current through the resistor 92 and therefore the voltage $e_2$ at the terminal 94 measured with respect to ground is proportional to the sine of the angle of rotation of the entire accelerometer 32 about the axis of the pivot 78, the axis of this pivot being parallel to the axis 19 of FIG. 1.

The voltage $e_2$ from an output terminal 94 is delivered to one terminal of the resistor 96 also forming part of the voltage summation circuit 44. This circuit also includes a resistor 98 which is connected between ground and the terminals of the resistors 92 and 96 remote from the output terminals 70 and 94, respectively, of the demodulator 42 and accelerometer 32. The resistors 72 and 96 have large values of resistance compared to the resistance of the resistor 98.

The output voltages $e_1$ and $e_2$ of the demodulator 42 and the accelerometer 32, respectively, are such that, if $e_1$ is positive for an angle of rotation of the outer gimbal with respect to the base 16 about the axis 20, then $e_2$ is positive for an angle of rotation or tilt of the base 16 in the same direction about the axis 19, the latter angle being the angle the line 17 makes with the vertical. Under these conditions, the voltage with respect to ground at the output terminal 100 of the voltage circuit 44 is a direct current summation voltage equal to $K(e_1+e_2)$ where K is a constant.

This summation voltage is delivered to the chopper 46 having a movable contact 102 driven synchronously from the line 52 by a coil 104 connected across this line. The chopped voltage is delivered to the high gain servoamplifier 48, the output of which is an alternating current signal having a voltage in phase or 180° out of phase with the voltage across the line 52 and an amplitude equal to $A(e_1+e_2)$ where A is another constant. This signal is delivered to a stator winding 108 of the torquer 24, which is of the induction motor type having a rotor 110 fixed to the shaft of the inner gimbal 12 of FIG. 1 to apply torque to such gimbal about its axis 18 whenever $(e_1+e_2)$ does not equal zero. The torquer 24 also has a quadrature stator winding 112 excited through a capacitor 114 from the line 52 so that such torque is developed by the torquer whenever a voltage $(e_1+e_2)$ exists and this torque is in the proper direction to cause the gyroscope to precess about the outer gimbal axis 20 until $e_1+e_2=0$.

The circuit including the pickoff 22, accelerometer 30, demodulator 34, voltage summation circuit 36, chopper 38, amplifier 40 and torquer 28 may be exactly similar to the circuit described above with reference to FIG. 2, and will not be further described.

Figure 3:
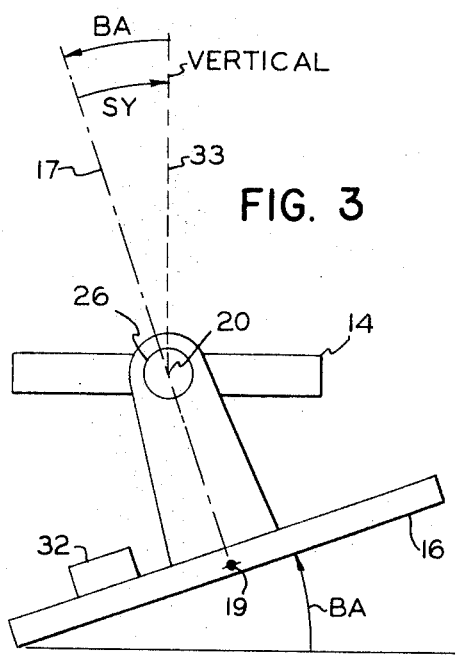
FIG. 3 is a diagrammatic view useful in explaining the operation of the disclosed system.

In the diagrammatic view of FIG. 3, the base 16 of the gyroscope is shown tilted about an angle BA. This is the angle of rotation of the base about the axis 19 referred to above. Thus $e_2$ is proportional to sin (BA). The outer gimbal 14 is shown in a position such that the spin axis 33 of the gyroscope is in a vertical plane through the axis 20 and makes an angle SY with the perpendicular 17 to the support 16. This is the angle of rotation of the outer gimbal with respect to the base about the axis 20, also referred to above, so that the voltage $e_1$ is proportional to sin (SY).

If the voltage $e_2$ is made equal to the voltage $e_1$, when the angle BA equals the angle SY, and the resistors 99 and 72 of FIG. 2 have the same resistance values, then $$K(e_2+e_1) = \sin(BA) + \sin(SY)$$

where K is a constant. It is apparent that $K(e_2+e_1)=0$ when $BA=-SY$ as is the case under the conditions shown in FIG. 3.

Figure 4:
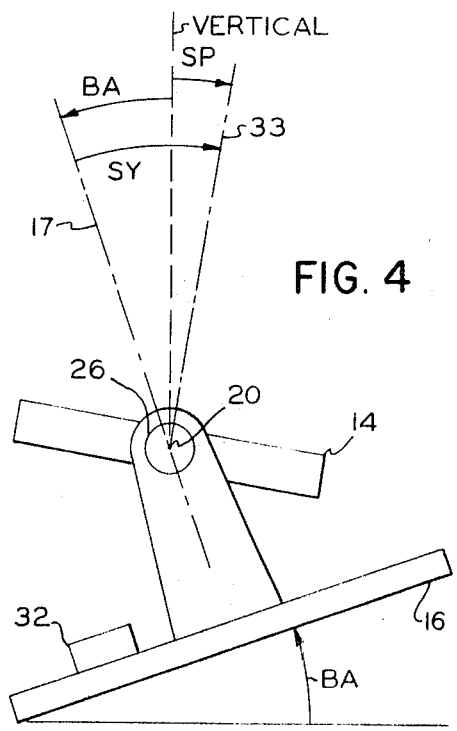
FIG. 4 is a view similar to FIG. 3 showing one element of the device in a different position.

The diagrammatic view of FIG. 4 is useful in showing that the voltage $K(e_2+e_1)$ has the necessary properties to return the spin axis 33 to a vertical position, if it is tilted from the vertical about the axis 20. This view shows the spin axis 33 tilted through an angle SP from the vertical about the axis 20. It is apparent that the angle SY of rotation of the spin axis 33 about the axis 20 with respect to the perpendicular 17 to the gyroscope base is such that $$SY=SP-BA \quad \text{and}$$

$$K(e_2+e_1) = \sin(BA) + \sin(SP-BA)$$

The requirement that the voltage $K(e_1+e_2)$ have the proper properties to be employed to return the spin axis 33 to the vertical is that $\sin(BA) + \sin(SP-BA)$ be positive when the angle SP is positive and be negative when the angle SP is negative. The actual value of this expression is not of importance since the amplifiers 40 and 48 of FIGS. 1 and 3 are usually of the type which will saturate at very small values of their input voltage $K(e_1+e_2)$. In any event, $K(e_1+e_2)$ has a value of zero when SP=0.

Figure 5:
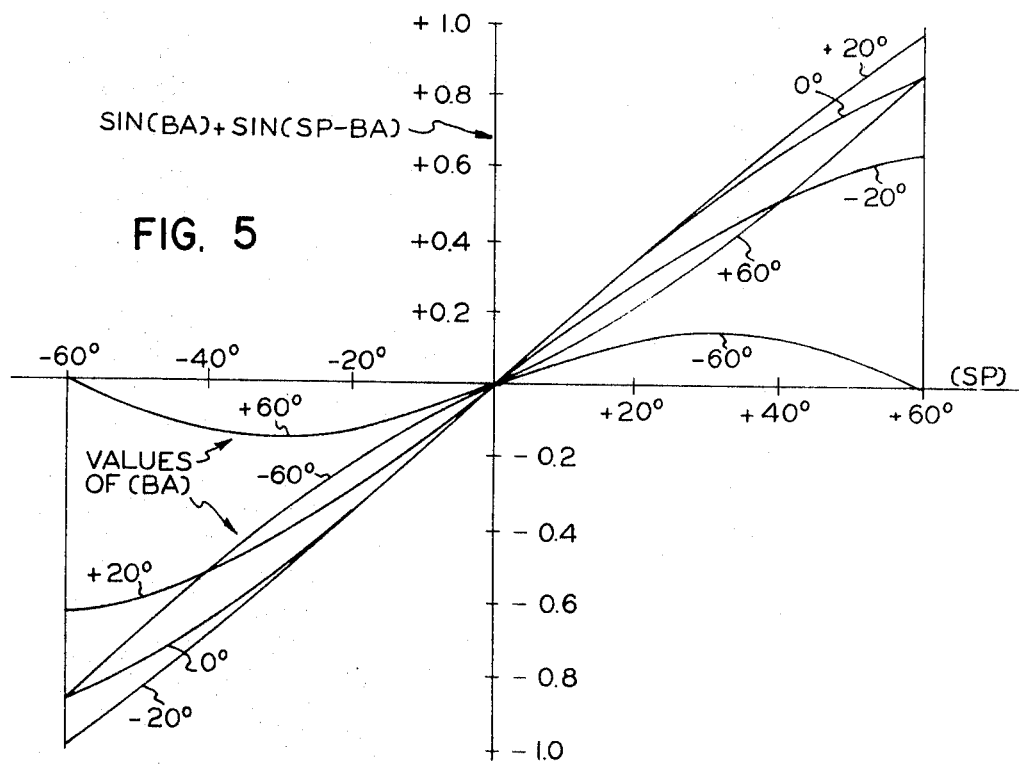
FIG. 5 is a graph also useful in explaining the operation of the system.

In FIG. 5, curves of the values of $\sin(BA) + \sin(SP-BA)$ have been plotted against values of SP from $-60°$ to $+60°$, for various values of BA ranging from $-60°$ to $+60°$. The curves for all values of BA between $-60°$ and $+60°$ fall within the area bounded by the curve for $+60°$ and approximately the curve for $BA=-20°$ for negative values of SP and within the area bounded by the curve for $BA=-60°$ and approximately the curve for $BA=+20°$ for positive values of SP so that the above requirement is met for all values of SP and BA between $-60°$ and $+60°$.

It is to be noted that the curve for $BA=-60$ changes sign when $SP=+60$. This means that the angle $SY=(SP-BA)$ between the perpendicular 17 to the gyroscope base and the spin axis 30 of the gyroscope is actually 120°. Similarly the angle SY for $SP=-60°$ and $BA=+60°$ is $-120°$. Thus if gimbal stops are provided so that the angle SY cannot reach $\pm120°$, any possibility of a reversal of sign of the value of $\sin(BA) + \sin(SP-BA)$ is avoided for values of BA between $\pm60°$. For other reasons, including so-called gimbal locking, when one of the gimbals rotates 90° with respect to the other from the position shown in FIG. 1, it is desirable as a practical matter to limit the possible values of the angle SY to somewhat less than 90°. Under these conditions, for a value of Sp of $+60°$, the value of BA cannot be more negative than $-30°$ or for a value of $Sp=-60°$ cannot be more positive than $+30°$. With the restriction of rotation of the outer gimbal to an angle SY not greater than $\pm90°$, it can be shown that the tilt of the base 16 with respect to the vertical about the axis 19 (angle BA) can also approach $\pm90°$ while still satisfying the requirement given above.

The same requirement applies to tilting of the base through an angle BA about the axis 18 of FIG. 1 and the rotation the inner 2+through an angle SP about the axis 21.

It is to be noted that the amplifiers 40 and 48 are usually of a type which will saturate so that the actual value of $K(e_2+e_1)$ is not of importance so long as this value goes to zero when SP=0 so that $SY=-BA$. While the theoretical limits are thus a tilt of the gyroscope base 16 through an angle just slightly less than 90° in either direction about either axis 18 or 19, and also angles just less than 90° in either direction between the spin axis of the gyroscope and the base about the axes 20 and 21, most requirements of use allow these angles to be restricted to angles of the order of 60°.

While force balanced accelerometers of the type in which the amplitude of the output of an oscillator circuit is controlled by eddy current losses in a pendulous mass mounted for movement relative to a position sensor are shown and described in the present application, other types of force balanced accelerometers are available depending, for example, for operation upon changes in capacitance or inductance produced by such relative movement. Also other types of accelerometers, for example, accelerometers providing signals directly proportional to the angle of tilt with respect to the vertical can be secured to the gyroscope support 16 or the structure upon which it is mounted and employed in conjunction with pickoff devices on the gimbal axis providing the same type of signals. Thus in general, any vertical sensing device which on the average will provide a signal which is a function of the instantaneous angle of tilt of a structure, may be employed in the present system. Also in general these devices cannot be employed alone to provide a vertical reference as they are subject to large short term errors due to any vibration of the structure and other movements involving short term accelerations. The present system, however, eliminates these errors and provides electrical signals which are functions of the instantaneous tilt of the support.

Although it was convenient to assume for purposes of explanation of the circuit of FIG. 3 that the voltages $e_1$ and $e_2$ are equal when the angles BA and SY are equal, this is an unnecessary restriction since exactly the same results are obtained when the ratio of the voltage $e_1$ to the resistance $R_1$ of resistor 72 is equal to the ratio of the voltage $e_2$ to the resistance $R_2$ of resistor 96 such that $$\frac{e_2}{R_2} + \frac{e_1}{R_1} = 0$$

when $BA=-SY$.

It is also apparent that direct current torquers can be employed so that the choppers 38 and 46 can be omitted or that the various electric signals discussed above can be converted to digital signals at any place in the system and subsequent modifications of signals performed by digital or computer operations to supply the various torques or desired outputs.

I claim:

1. A vertical reference system comprising:
    a support;
    a gyroscope including a rotor mounted in inner and outer gimbals on said support for angular movement about inner and outer gimbal axes;
    first and second pickoff means on said inner and outer gimbal axes respectively for supplying first and second electric signals respectively which are functions of any angles of tilt of the support with respect to the spin axis of said gyroscope about said inner and outer gimbal axes respectively;
    first and second sensing means for supplying third and fourth electric signals respectively which are on the average functions of corresponding angles of tilt of said support with respect to the vertical about an axis normal to the outer gimbal axis and an axis parallel to the outer gimbal axis respectively;
    circuit means connected to said pickoffs and said sensing means for obtaining a first combined electric signal which is a function of the sum of said first and third signals and a second combined electric signal which is a function of the sum of said second and fourth signals;
    first torquer means for applying torque about said inner gimbal axis between said inner gimbal and said outer gimbal and second torquer means for applying torque about said outer gimbal axis between said outer gimbal and said base; and
    circuit means for supplying said first combined signal to said second torquer means and said second combined signal to said first torquer means to thereby apply torque to said gimbals causing said gyroscope to precess in a direction which will align said spin axis with the vertical.

2. A vertical reference system in accordance with claim 1 in which said first and second pickoff means supply first and second electric signals which are proportional to the sines of any angles of tilt of the support with respect to said spin axis about said inner and outer gimbal axes respectively and said sensing means supply third and fourth electric signals which on the average are proportional to the sines of said corresponding angles of tilt of said support with respect to the vertical.

3. A vertical reference system in accordance with claim 1 in which said sensing means are angle sensing devices secured in fixed position relative to said support.

4. A vertical reference system in accordance with claim 2 in which said sensing means are each a force balanced accelerometer having a frame rigidly secured with respect to said support.

5. A vertical reference in accordance with claim 1 in which each said pickoffs supplies an alternating electric signal and each said angle sensing means supplies a direct current signal,
  said circuit has means for converting said alternating electric signals to separate direct current signals prior to obtaining said combined electric signals so that said combined electric signals are direct current amplified electric signals, and
  said circuit also contains means for converting said direct current amplified electric signals to alternating current signals prior to supplying them to said torquers.

PO-1050
(5/69)

UNITED STATES PATENT OFFICE
CERTIFICATE OF CORRECTION

Patent No. 3,587,330                     Dated   June 28, 1971

Inventor(s)    James W. Deer

It is certified that error appears in the above-identified patent and that said Letters Patent are hereby corrected as shown below:

Column 1, line 18, "process" should read --precess--.

Column 5, line 49, "sin (SP-BA" should read --sin (SP-BA) with respect to the value of SP--;
Column 5, line 64, after "rotation" insert --of--;
Column 5, line 65, change "2+" to --gimbal--.

Signed and sealed this 14th day of December 1971.

(SEAL)
Attest:

EDWARD M. FLETCHER, JR.                ROBERT GOTTSCHALK
Attesting Officer                      Acting Commissioner of Patents